US009840282B2

(12) United States Patent
Nusier et al.

(10) Patent No.: US 9,840,282 B2
(45) Date of Patent: Dec. 12, 2017

(54) COLLISION COUNTER MEASURE STRUCTURE ATTACHED TO A SUB-FRAME INCLUDING A LEG THAT CONTACTS A FRAME RAIL

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/096,506

(22) Filed: Apr. 12, 2016

(65) Prior Publication Data
US 2017/0291645 A1    Oct. 12, 2017

(51) Int. Cl.
*B62D 21/15*    (2006.01)

(52) U.S. Cl.
CPC ................... *B62D 21/155* (2013.01)

(58) Field of Classification Search
CPC .......... B60R 2021/0023; B62D 21/152; B62D 21/155; B62D 25/085; B62D 25/2018
USPC ... 296/187.1, 187.09, 193.09, 203.02, 184.1, 296/204, 187.08
See application file for complete search history.

(56) References Cited

U.S. PATENT DOCUMENTS

| 2,088,087 | A | * | 7/1937 | Hudson | E01F 15/146 256/1 |
|---|---|---|---|---|---|
| 7,926,847 | B2 | | 4/2011 | Auer et al. | |
| 8,464,825 | B2 | | 6/2013 | LaTurner et al. | |
| 8,544,589 | B1 | * | 10/2013 | Rupp | B62D 21/152 180/274 |
| 9,187,053 | B2 | * | 11/2015 | Nusier | B60R 19/34 |
| 9,421,865 | B2 | * | 8/2016 | Bernardi | B60K 5/1275 |
| 9,539,968 | B2 | * | 1/2017 | Nishida | B62D 21/152 |
| 9,550,463 | B2 | * | 1/2017 | Hara | B60R 19/34 |
| 9,555,754 | B2 | * | 1/2017 | Hara | B62D 21/152 |
| 2004/0051321 | A1 | * | 3/2004 | Hanai | B60R 19/26 293/132 |
| 2010/0032983 | A1 | * | 2/2010 | Kusaka | B60G 99/004 296/187.03 |
| 2012/0056447 | A1 | * | 3/2012 | Yoshida | B62D 21/155 296/193.09 |

(Continued)

FOREIGN PATENT DOCUMENTS

DE    202014102118 U1  *  6/2015  .......... A45D 40/265
JP    08040313 A  *  2/1996

Primary Examiner — H Gutman
(74) Attorney, Agent, or Firm — Jason Rogers; Brooks Kushman P.C.

(57) ABSTRACT

A collision countermeasure apparatus includes an impact absorbing body attached to an outboard side of a sub-frame and a rigid link. The rigid link is attached to the impact absorbing body at an outboard location and extends upward to an outer side of a frame rail. A frontal impact with a rigid barrier outboard of the frame rail drives the impact absorbing body into the link to force the link into the outer side of the frame rail. The force applied to the frame rail by the impact absorbing body laterally displaces the vehicle to reduce the extent of intrusion into the passenger compartment of the vehicle.

17 Claims, 5 Drawing Sheets

(56) References Cited

U.S. PATENT DOCUMENTS

| | | | | |
|---|---|---|---|---|
| 2012/0248819 A1* | 10/2012 | Okamura | ................ | B60R 19/12 296/187.1 |
| 2013/0241233 A1* | 9/2013 | Ohnaka | ................ | B62D 21/152 296/187.1 |
| 2015/0035316 A1* | 2/2015 | Kuriyama | ............ | B62D 25/082 296/187.1 |
| 2015/0042124 A1* | 2/2015 | Hyodo | .................... | B60R 19/34 296/187.1 |
| 2015/0137556 A1* | 5/2015 | Alavandi | ............... | B62D 25/08 296/187.1 |
| 2015/0298634 A1* | 10/2015 | Hara | ....................... | B60R 19/34 293/133 |
| 2015/0329144 A1* | 11/2015 | Hara | ................... | B62D 21/152 296/187.09 |

* cited by examiner

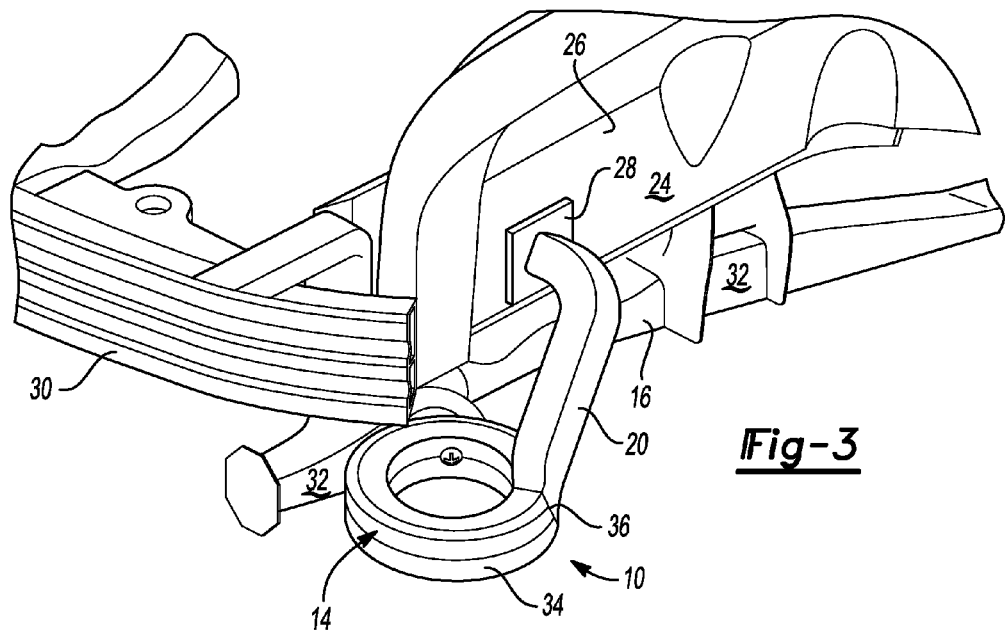
Fig-3
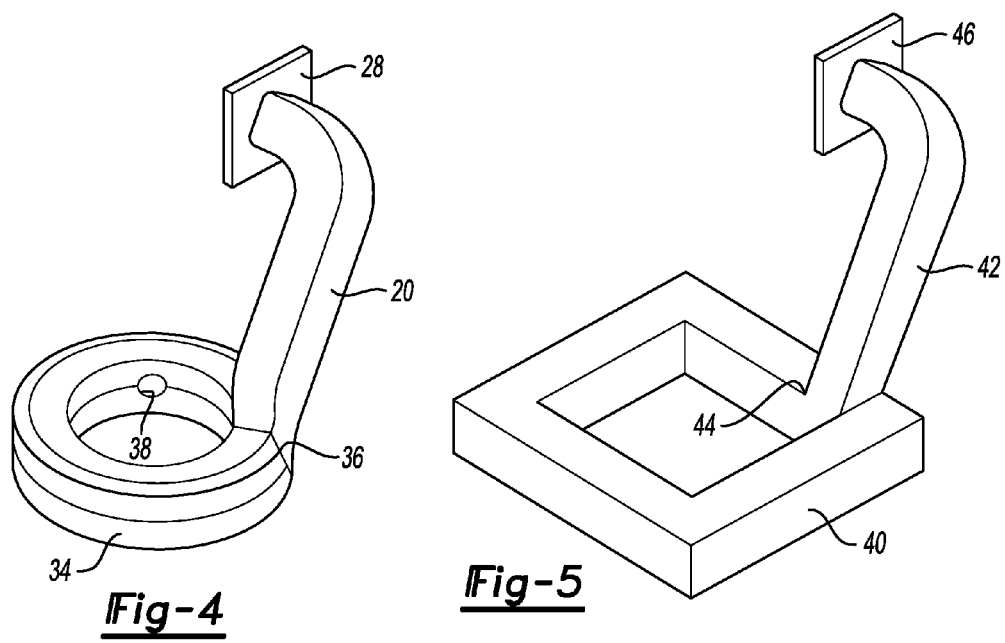
Fig-4
Fig-5

COLLISION COUNTER MEASURE STRUCTURE ATTACHED TO A SUB-FRAME INCLUDING A LEG THAT CONTACTS A FRAME RAIL

TECHNICAL FIELD

This disclosure relates to body structures of vehicles that deflect a vehicle laterally in response to a small offset collision with a rigid barrier.

BACKGROUND

Land vehicles are tested for crashworthiness by a variety of tests including frontal impacts, side impacts, rear impacts, roll-over and other tests. Frontal impact tests were previously developed that specified that a vehicle impacts a barrier between the frame rails that extend longitudinally relative to the vehicle. In this type of test, the frame rails provide the primary support for the vehicle body.

A test known as the Small Offset Rigid Barrier (SORB) test simulates small offset frontal collisions against a rigid barrier. In the proposed test, the vehicle impacts a rigid barrier having a six inch pole-like radius on one corner with a 25% overlap at 40 MPH. The impact is outboard of the frame rails so that the frame rails do not provide as much resistance to intrusion into the passenger compartment as in the case of impacts between the frame rails.

The weight of land vehicles is being substantially reduced to improve fuel efficiency. Vehicles are currently being designed to reduce the weight of the vehicle with a parallel objective of not compromising performance or crashworthiness. The problems addressed by this disclosure include meeting SORB test requirements while reducing vehicle weight and reducing manufacturing costs.

The above problems and other problems are addressed by this disclosure as summarized below.

SUMMARY

According to one aspect of this disclosure, a collision countermeasure apparatus is disclosed that comprises an impact absorbing body attached to an outboard side of a sub-frame and a rigid link. The rigid link is attached to the impact absorbing body at an outboard location and extends upward to an outer side of a frame rail. A frontal impact with a rigid barrier outboard the frame rail drives the impact absorbing body into the link to force the link into the outer side of the frame rail.

According to other aspects of this disclosure, the impact absorbing body may be a closed ring that defines a central opening. The closed ring may be a circular annulus, a rectilinear closed ring, an octagonal closed ring, or the like.

The rigid link may further comprise a first leg extending upwardly and rearward from a top surface of the impact absorbing body to a bend and a second leg extending laterally from the bend to the outer side of the frame rail. The first leg may be attached to the impact absorbing body and extend upward from a top surface of the impact absorbing body. A plate may be attached to the second leg that abuts the frame rail to slide along the frame rail in a full-frontal collision.

The frame rail may be a first frame rail and a second frame rail may be provided that extends longitudinally and parallel to the first frame rail. A second impact absorbing body may be attached to an outboard side of the sub-frame. A second rigid link may be attached to the second impact absorbing body at an outboard location that extends upward to an outer side of the second frame rail. In a frontal impact with a rigid barrier outboard the second frame rail, the second impact absorbing body may be driven into the link to force the link into the outer side of the second frame rail. The sub-frame is attached below the first frame rail and the second frame rail in a front portion of a vehicle.

A vehicle is supported by the frame rail so that a force applied by the link to the outer side of the frame rail deflects the vehicle in an inboard direction.

According to another aspect of this disclosure, a vehicle structure is disclosed for laterally deflecting a vehicle in a collision with a barrier outboard of the frame rails. A pair of frame rails supports the vehicle and a sub-frame is secured below the frame rails. One of a pair of impact absorbing bodies is attached to one lateral side of the sub-frame. One of a pair of links is attached to one of the bodies and extends to a plate that slides along one frame rail in a full-frontal collision. The links are configured to be laterally driven into one of the frame rails in a laterally offset collision.

According to other aspects of this disclosure, the pair of impact absorbing bodies may be a pair of closed rings that define a central opening. The pair of bodies may be a pair of circular annuluses. The pair of links may each further comprise a first leg extending upwardly and rearward from a top surface of one of the pair of bodies to a bend and a second leg extending laterally from the bend to an outer side of one of the pair of frame rails. The first leg may extend upward from a top surface of one of the pair of bodies and may be attached to one of the pair of bodies.

According to another aspect of this disclosure, a vehicle structure is disclosed that comprises an annular ring attached to a sub-frame a link attached on a lower end to the annular ring and facing an outer wall of a frame rail on an upper end, and a plate attached to the upper end of the link. An impact force applied to the annular ring is transferred to the link to force the plate laterally into the frame rail.

The frame rail may be laterally displaced when the plate is forced laterally into the frame rail. In a frontal impact, forces applied to the frame rail cause the plate to slide along the frame rail.

The vehicle structure may further comprise a vehicle body supported on the frame rail that is laterally displaced when the plate is forced laterally into the frame rail.

The above aspects of this disclosure and other aspects will be described below with reference to the attached drawings.

BRIEF DESCRIPTION OF THE DRAWINGS

FIG. 3 is a front side perspective view of the collision countermeasure apparatus shown in FIG. 1.

FIG. 4 is a perspective view of the collision countermeasure apparatus shown in FIG. 1 in isolation.

FIG. 5 is an alternative embodiment of a collision countermeasure apparatus having a rectilinear closed ring impact absorbing body.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Relative terms for spacial relationships as referred to in this disclosure should be understood as being vehicle directions with the vehicle having a "longitudinal direction" that extends from the front of the vehicle to the rear of the vehicle. The "lateral direction" extends in the cross-vehicle direction. A "centerline" of the vehicle extends in the longitudinal direction and is at the lateral center of the vehicle. For example, the term "outboard of the frame rails" refers to a side of the frame rails that is on the opposite side of the frame rails from the centerline. The "outward direction" is the direction extending away from the centerline.

The term "SORB" refers to a Small Offset Rigid Barrier test the replicates a collision of a vehicle with a rigid barrier that is outboard of the frame rails and involves less than 25% of the width of the vehicle. The term "NCAP" generally refers to a series of New Car Assessment Program tests and one of the tests is referred to as the "NCAP—Pulse" test in which a vehicle collides in a full frontal crash with a rigid barrier at a speed of 35 MPH between the frame rails of the vehicle. For brevity, the NCAP—Pulse test is referred to herein as simply "NCAP."

Figure 1:
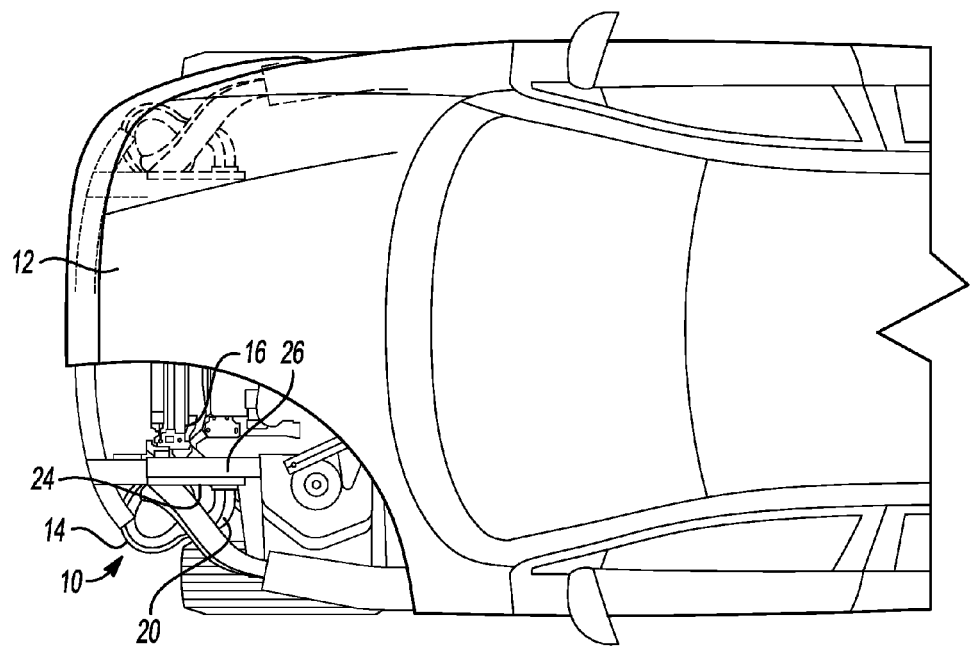
FIG. 1 is a fragmentary top plan view of a vehicle including a sub-frame countermeasure apparatus made according to one embodiment of this disclosure.
Figure 2:
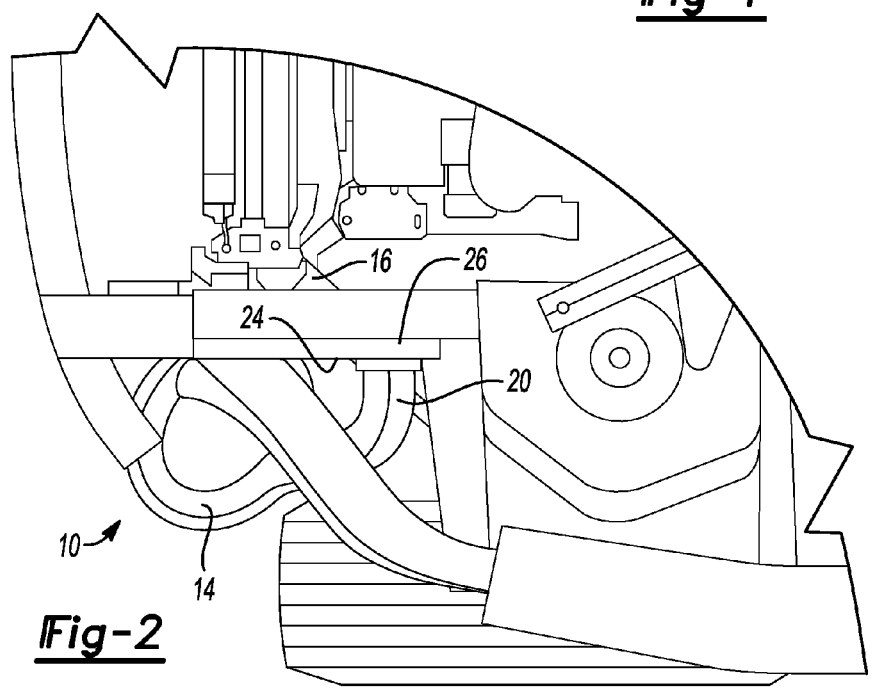
FIG. 2 is an enlarged view of the countermeasure apparatus shown in FIG. 1.

Referring to FIGS. 1 and 2, a collision countermeasure apparatus 10 is illustrated as it is attached to a vehicle 12. The countermeasure apparatus 10 includes an impact absorbing body 14 that is attached to the sub-frame 16 of the vehicle 12. The impact absorbing body 14 is connected by a rigid link 20 to an outer side 24 of a frame rail 26 of the vehicle 12. An attachment plate 28 (shown in FIGS. 3-6) is loaded or otherwise attached to the upper end of the rigid link 20 and is disposed between the frame rail 26 and the upper end of the rigid link 20. The attachment plate 28 is not welded or bolted to the frame rail 26. The attachment plate 28 (shown in FIGS. 3-6) is provided to facilitate sliding displacement of the rigid link 20 relative to the frame rail 26 in a collision that occurs between the frame rails 26 of the vehicle 12.

Referring to FIG. 3, the countermeasure apparatus 10 is shown with most of the front end components removed to provide better visibility of the impact absorbing body 14 and the rigid link 20. The impact absorbing body 14 is attached to the sub-frame 16 by a fastener or by welding. The impact absorbing body 14 is secured below the bumper 30 to an outboard side 32 of the sub-frame 16. In the embodiment of FIGS. 1-4, the impact absorbing body 14 is an annular ring 34. The annular ring 34 may be formed as a tube that is bent to form the annular ring 34 or may be assembled from two parts in a clamshell-like manner. The rigid link 20 is secured to the annular ring 34 at an outboard location 36. A fastener receiving opening 38 is provided on the annular ring 34 to facilitate fastening the annular ring 34 to the sub-frame 16. Alternatively, the rigid link may be welded to the annular ring 34.

In a collision, the annular ring 34, which is a closed ring, is driven and compressed in the rearward direction. The rearward displacement of the annular ring 34 forces a lower end of the rigid link 20 rearward and also causes the upper end of the rigid link 20 to be driven into the sliding plate 28 and, in turn, into the frame rail 26. The rigid link 20 exerts a laterally directed force on the frame rail 26 and causes the vehicle 12 to be displaced laterally in a small offset collision.

Referring to FIG. 5, an impact absorbing body 40 is shown that includes a rigid link 42 attached at an outboard location 44 on the rectilinear impact absorbing body 40. The rigid link 42 is connected to a slip plate 46. The slip plate 46 is disposed between the upper end of the rigid link 42 and the frame rail 26 (as shown in FIGS. 1-3).

Figure 6:
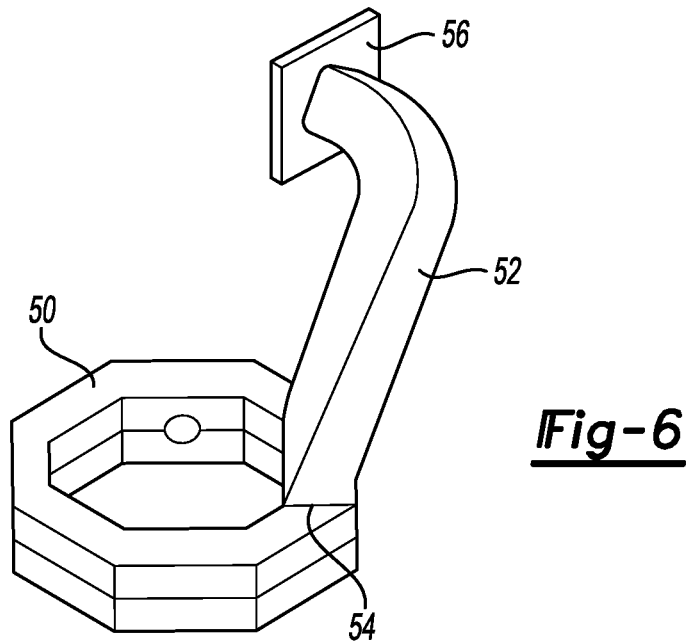
FIG. 6 is another alternative embodiment of a collision countermeasure apparatus having an octagonal closed ring impact absorbing body.

Another alternative embodiment is shown in FIG. 6. An octagonal impact absorbing body 50 is shown in FIG. 6 that includes a rigid link 52 attached at an outboard location 54 to the octagonal impact absorbing body 50. An attachment plate 56 is provided between the upper end of the rigid link 52 and the frame rail (as shown in FIGS. 1-3).

Figure 7:
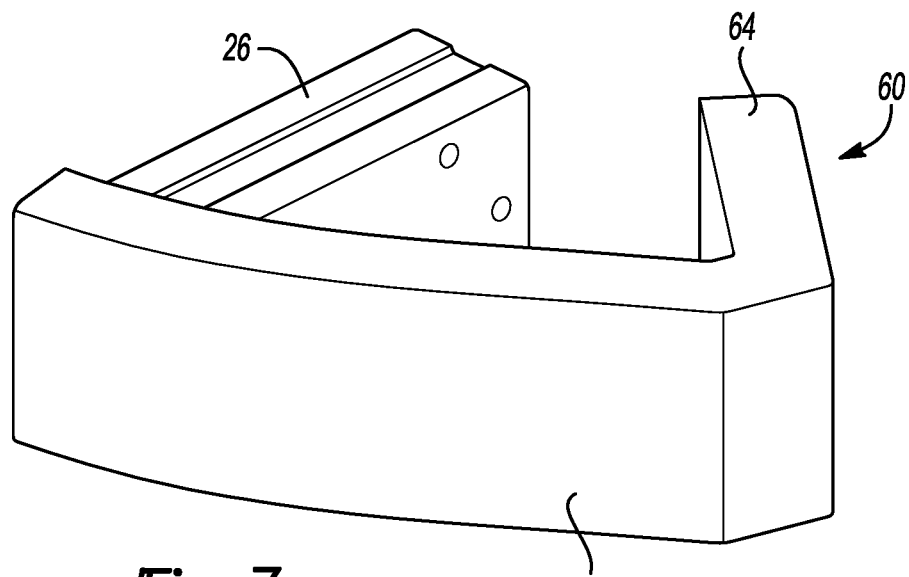
FIG. 7 is a perspective view of a prior art collision countermeasure apparatus used in comparative simulated SORB testing.

Referring to FIG. 7, a prior art hook-shaped countermeasure apparatus 60 is shown that includes a front wall 62 that extends outwardly and rearward from a front end of the frame rail 26. A rear wall 64 extends rearward and inwardly toward the frame rail 26. This type of collision countermeasure apparatus was used in the simulated test described below with reference to FIGS. 8 and 9 comparing the design of the impact absorbing body 14 disclosed in FIGS. 1-4, to the prior art collision countermeasure apparatus shown in FIG. 7, and to a base design that did not include a collision countermeasure apparatus outboard of the frame rails.

Figure 8:
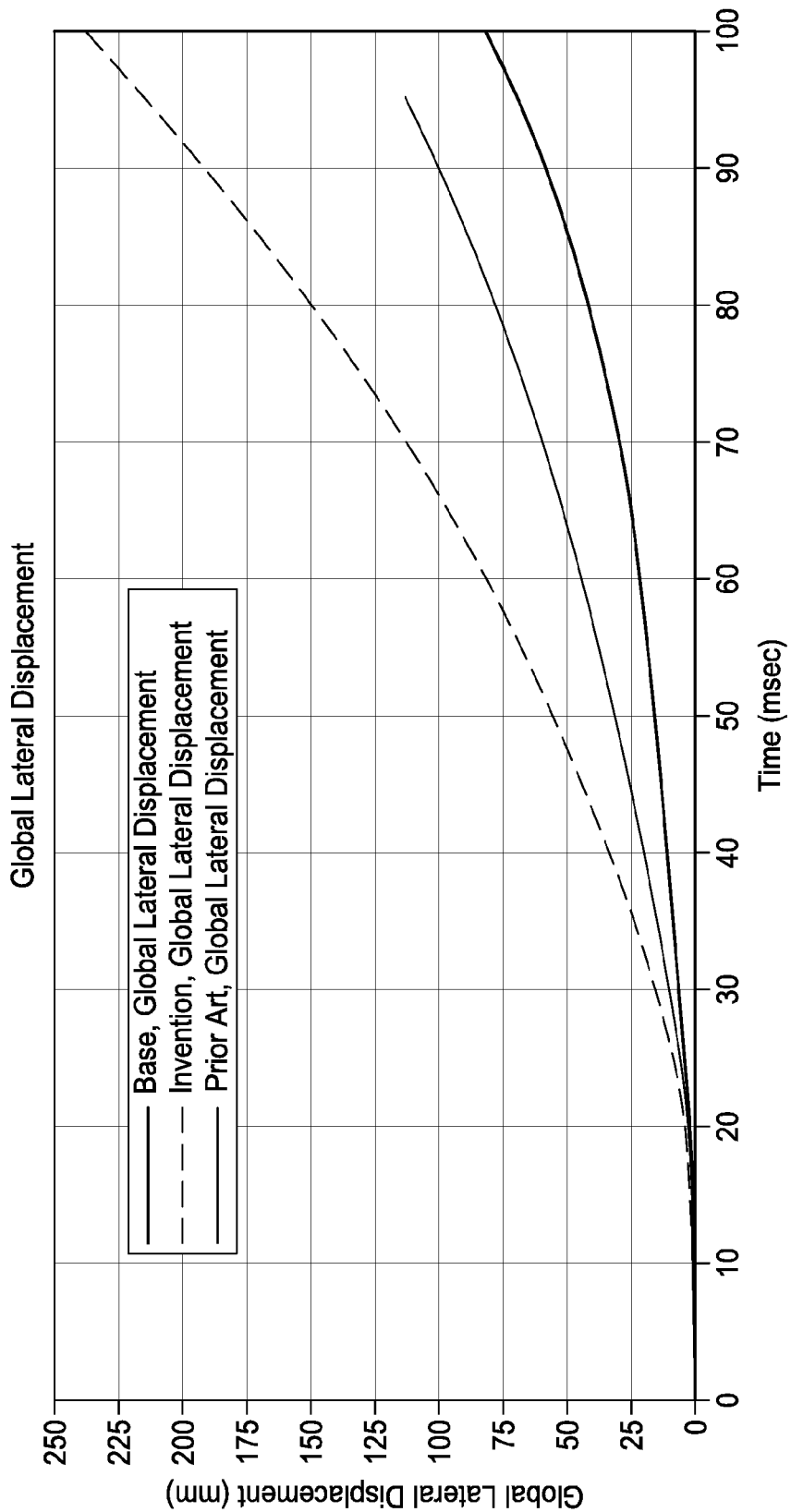
FIG. 8 is a chart showing the global lateral displacement in millimeters versus time in millisecond of a base design not including a collision countermeasure apparatus, a prior art device corresponding to the collision countermeasure apparatus shown in FIG. 7, and the collision countermeasure apparatus shown in FIGS. 1-4.
Figure 9:
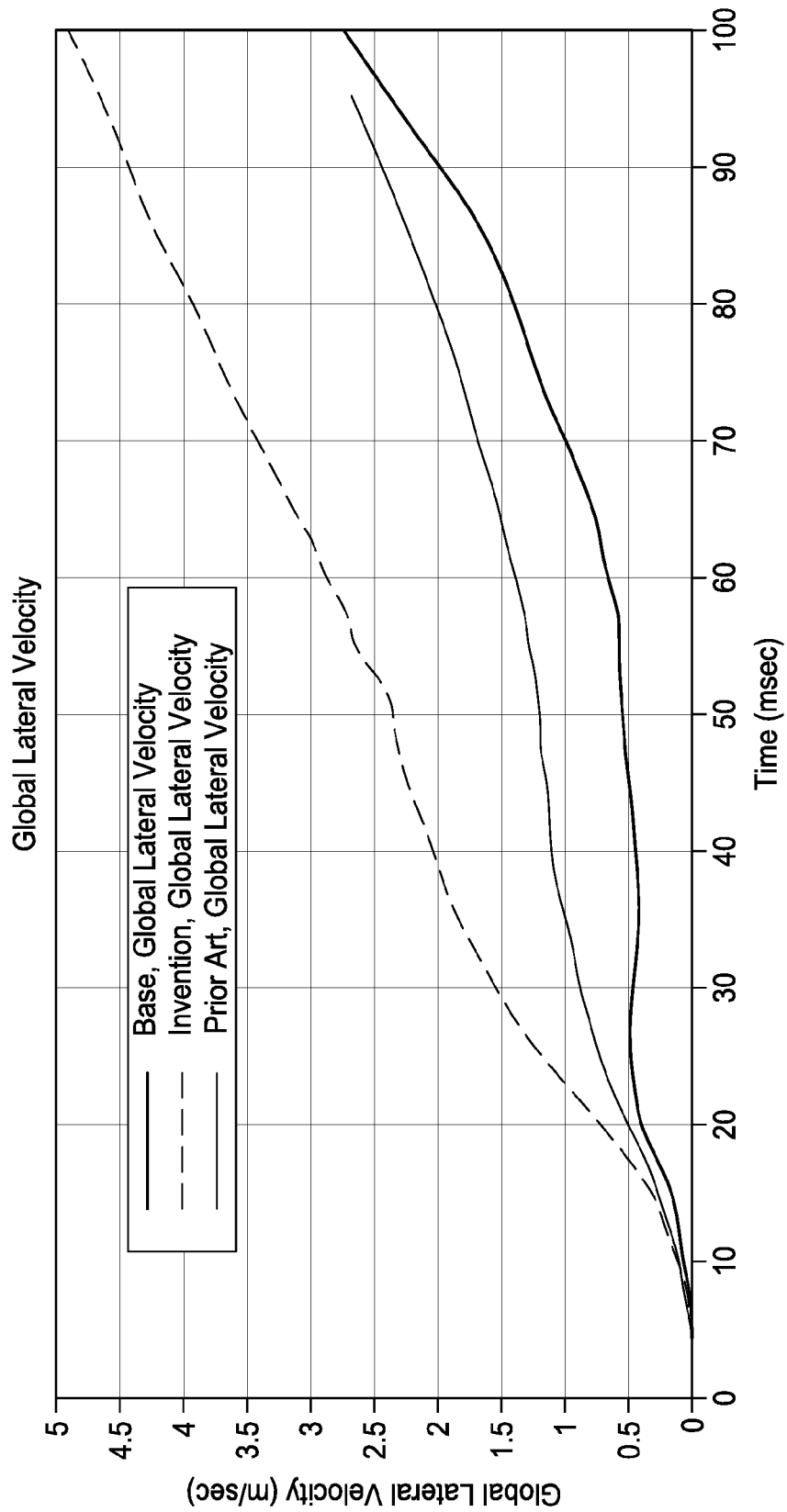
FIG. 9 is a chart of the global lateral velocity in meters per second in milliseconds for the base design, the prior art design, and the collision countermeasure apparatus of FIGS. 1-4.

Referring to FIG. 8, a chart showing the global lateral displacement in millimeters over time in milliseconds is shown for a base vehicle that does not include any collision countermeasures outboard of the frame rails, to a simulated test of the prior art embodiment shown in FIG. 7, and the embodiment shown in FIGS. 1-4. As shown in FIG. 8, the lateral displacement of the base design in 90 m/sec is approximately 70 mm; the global lateral displacement for the prior art embodiment of FIG. 7 is 100 mm at 90 msec; while the global lateral displacement of the embodiment shown in FIGS. 1-4 at 90 msec is approximately 190 mm.

Referring to FIG. 9, again the base model is compared in a simulated test to the prior art embodiment of FIG. 7 and also to the embodiment of FIGS. 1-4. At 90 msec the base vehicle at a global lateral velocity of 2 m/sec. The embodiment of FIG. 7 had a global lateral velocity of approximately 2.4 m/sec. The embodiment of FIGS. 1-4 had a global lateral velocity of slightly less than 4.5 m/sec. The simulated test of the charts of FIGS. 8 and 9 indicate that the disclosed embodiment of FIGS. 1-4 approximately doubles the global lateral displacement and the global lateral velocity of a vehicle in a small offset collision compared to the static hook collision countermeasure apparatus shown in FIG. 7.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A collision countermeasure apparatus comprising:
   an impact absorbing body attached to an outboard side of a sub-frame; and
   a rigid link attached to the impact absorbing body at an outboard location and extending upward to an outer side of a frame rail, wherein a frontal impact with a rigid barrier outboard the frame rail drives the impact absorbing body into the rigid link to force the link into the outer side of the frame rail, wherein the impact absorbing body is a closed ring that defines a central opening.

2. The apparatus of claim 1 wherein the closed ring is a circular annulus.

3. A collision countermeasure apparatus comprising:
   an impact absorbing body attached to an outboard side of a sub-frame; and
   a rigid link attached to the impact absorbing body at an outboard location and extending upward to an outer side of a frame rail, wherein a frontal impact with a rigid barrier outboard the frame rail drives the impact absorbing body into the rigid link to force the link into the outer side of the frame rail;
   a first leg extending upwardly and rearward from a top surface of the impact absorbing body to a bend,
   a second leg extending laterally from the bend to the outer side of the frame rail; and
   a plate attached to the second leg and abutting the frame rail to slide along the frame rail in a full-frontal collision.

4. The apparatus of claim 3 wherein the first leg is attached to the impact absorbing body to extend upward from a top surface of the impact absorbing body.

5. The apparatus of claim 1 wherein the frame rail is a first frame rail, the apparatus further comprising:
   a second frame rail extending longitudinally and parallel to the first frame rail;
   a second impact absorbing body attached to an outboard side of the sub-frame; and
   a second rigid link attached to the second impact absorbing body at an outboard location and extending upward to an outer side of the second frame rail, wherein a frontal impact with a rigid barrier outboard the second frame rail drives the second impact absorbing body into the second rigid link to force the second rigid link into the outer side of the second frame rail.

6. The apparatus of claim 5 wherein the sub-frame is attached below the first frame rail and the second frame rail in a front portion of a vehicle.

7. The apparatus of claim 1 wherein the sub-frame is attached below the frame rail in a front portion of a vehicle.

8. The apparatus of claim 1 further comprises:
   a vehicle supported by the frame rail, and wherein a force applied by the rigid link to the outer side of the frame rail deflects the vehicle in an inboard direction.

9. A vehicle structure comprising:
   a pair of frame rails supporting a vehicle;
   a sub-frame secured below the frame rails;
   a pair of bodies each attached to one lateral side of the sub-frame, and
   a pair of links each attached to one of the bodies and extending to a plate that slides along one frame rail in a full-frontal collision, the links are laterally driven into one of the frame rails in a laterally offset collision.

10. The vehicle structure of claim 9 wherein the pair of bodies are a pair of closed rings that define a central opening.

11. The vehicle structure of claim 10 wherein the pair of bodies are a pair of circular annuluses.

12. The vehicle structure of claim 9 wherein the pair of links each further comprise:
   a first leg extending upwardly and rearward from a top surface of one of the pair of bodies to a bend, and
   a second leg extending laterally from the bend to an outer side of one of the pair of frame rails.

13. The vehicle structure of claim 12 wherein the first leg extends upward from a top surface of one of the pair of bodies and is attached to one of the pair of bodies.

14. A vehicle structure comprising:
   an annular ring attached to a sub-frame;
   a link attached on a lower end to the annular ring and facing an outer wall of a frame rail on an upper end; and
   a plate attached to the upper end of the link, wherein an impact force applied to the annular ring is transferred to the link to force the plate laterally into the frame rail.

15. The vehicle structure of claim 14 wherein the frame rail is laterally displaced when the plate is forced laterally into the frame rail.

16. The vehicle structure of claim 14 further comprising:
   a vehicle body supported on the frame rail wherein the vehicle body is laterally displaced when the plate is forced laterally into the frame rail.

17. The vehicle structure of claim 14 wherein a frontal impact force applied to the frame rail causes the plate to slide along the frame rail.

* * * * *